United States Patent
Miller, Jr. et al.

(10) Patent No.: US 7,145,453 B2
(45) Date of Patent: Dec. 5, 2006

(54) HARMONIC WIRELESS TRANSPONDER SENSOR AND METHOD

(75) Inventors: Theodore E. Miller, Jr., Midland, MI (US); Eugene L. Liening, Freeland, MI (US); Malcolm W. Warren, II, Midland, MI (US); Leo C. Kempel, Okemos, MI (US); Gregory L. Charvat, East Lansing, MI (US)

(73) Assignees: The Dow Chemical Company, Midland, MI (US); Michigan State University, East Lansing, MI (US)

( * ) Notice: Subject to any disclaimer, the term of this patent is extended or adjusted under 35 U.S.C. 154(b) by 317 days.

(21) Appl. No.: 10/932,790

(22) Filed: Sep. 2, 2004

(65) Prior Publication Data

US 2006/0044178 A1    Mar. 2, 2006

(51) Int. Cl.
    *G08B 1/08*    (2006.01)
(52) U.S. Cl. .............. 340/539.26; 340/539.1; 340/545.3; 340/552; 340/567
(58) Field of Classification Search ........ 340/539.1, 340/539.26, 545.3, 552, 567
    See application file for complete search history.

(56) References Cited

U.S. PATENT DOCUMENTS

| | | | |
|---|---|---|---|
| 3,713,148 A | 1/1973 | Cardullo et al. | |
| 3,781,879 A | 12/1973 | Staras et al. | |
| 3,852,755 A | 12/1974 | Works et al. | |
| 4,001,822 A | 1/1977 | Sterzer | |
| 4,003,049 A | 1/1977 | Sterzer et al. | |
| 4,011,563 A | 3/1977 | Robbi | |
| 4,063,229 A | 12/1977 | Welsh et al. | |
| 4,331,957 A * | 5/1982 | Enander et al. | 342/22 |
| 4,609,905 A | 9/1986 | Uzzo | |
| 5,446,369 A | 8/1995 | Byrne et al. | |
| 6,617,963 B1 | 9/2003 | Watters et al. | |
| 6,856,275 B1 * | 2/2005 | Ehlers et al. | 342/42 |
| 6,925,287 B1 * | 8/2005 | Davie et al. | 455/41.1 |
| 6,946,989 B1 * | 9/2005 | Vavik | 342/51 |
| 6,999,723 B1 * | 2/2006 | Kusbel et al. | 455/63.1 |
| 2002/0106988 A1 | 8/2002 | Davie et al. | |

OTHER PUBLICATIONS

Chang, Kai, "Microstrip Patch Antennas", Microwave Circuit and Component Design for Wireless Systems, Chapter 12.9, pp. 496-500 (2002).
Mass, Stephen A., "Single-Diode Resistive Frequency Doubler", The RF and Microwave Circuit Design Cookbook, Chapter 4 (1998).

* cited by examiner

*Primary Examiner*—Daryl C Pope

(57) ABSTRACT

A method for detecting a latent environmental effect (such as a corrosive environment under insulation) or a latent structural change (such as a crack in a concealed structural member) at a known remote concealed location. The method of the instant invention includes three steps. The first step is to use a harmonic electromagnetic transponder at the known remote concealed location of the latent environmental effect or the latent structural change, the harmonic electromagnetic transponder having a reactive portion which reacts to the latent environmental effect or latent structural change to modify the harmonic emission of the transponder. The second step is to remotely interrogate the transponder by directing electromagnetic radiation at the transponder. The third step is to use the harmonic emission of the transponder to remotely determine the latent environmental effect or the latent structural change.

16 Claims, 3 Drawing Sheets

HARMONIC WIRELESS TRANSPONDER SENSOR AND METHOD

BACKGROUND

The instant invention is in the field of sensors and more specifically the instant invention is in the field of wireless sensors employing harmonic electromagnetic transponders.

A harmonic electromagnetic transponder receives electromagnetic radiation at a fundamental frequency and emits electromagnetic radiation at a harmonic of the fundamental frequency. The harmonic of the fundamental frequency is usually the first harmonic (or twice the fundamental frequency). A passive harmonic electromagnetic transponder requires no power source (other than the power of the incoming electromagnetic radiation) for its operation. An active harmonic electromagnetic transponder requires a power source for its operation. As discussed by Maas, The RF and Microwave Circuit Design Cookbook, 1998, Chapter 2, a common passive harmonic electromagnetic transponder comprises a receiving antenna tuned to resonate at the frequency of the incoming electromagnetic radiation, an emitting antenna tuned to resonate at twice the frequency of the incoming electromagnetic radiation, the receiving antenna being electrically connected to the emitting antenna by a Schottky diode. The electromagnetic radiation is usually in the radio wave or "radar" portion of the electromagnetic spectrum.

U.S. Pat. No. 3,781,879 described a harmonic radar detecting and ranging system for automotive vehicles wherein the receiving and emitting antennas are arranged for orthogonal polarization of the received and emitted electromagnetic radiation. U.S. Pat. No. 4,001,822 described a harmonic radar electronic license plate for motor vehicles incorporating a single antenna for receiving electromagnetic radiation and for emitting a unique pulse coded electromagnetic radiation at a harmonic frequency of the received electromagnetic radiation. U.S. Pat. No. 4,063,229 described a harmonic radar anti-shoplifting system incorporating a fusible link or other means in the electronic circuit of a tag to be incorporated into goods for sale so that the tag could be deactivated at the store's checkout counter before the goods passed the radar transmitter/receiver located at the exit(s) of the store.

Steel pipes, vessels and structural members (such as I-beams) are commonly used in industrial installations and are frequently covered with insulation. Inadvertent latent corrosion of such pipes, vessels or structural members can occur under the insulation which corrosion can be expensive to repair and can even end the useful life of the pipe, vessel or structural member. Therefore, it is common practice to periodically remove a portion of the insulation to inspect for such corrosion. Such inspections are expensive and invasive of the integrity of the insulation. It would be an advance in the art of such inspections if a non-invasive remote wireless inspection means were devised.

SUMMARY OF THE INVENTION

The instant invention provides, for example, a non-invasive remote wireless means to detect a condition that may lead to inadvertent latent corrosion of an insulated steel pipe, vessel or structural member. In its broad scope, the instant invention provides a method for detecting a latent environmental effect or a latent structural change at a known remote location. The method of the instant invention comprises three steps. The first step is to use a harmonic electromagnetic transponder at the known remote concealed location of the latent environmental effect or the latent structural change, the harmonic electromagnetic transponder having a reactive portion which reacts to the latent environmental effect or latent structural change to modify the harmonic emission of the transponder. The second step is to remotely interrogate the transponder by directing electromagnetic radiation at the transponder. The third step is to use the harmonic emission of the transponder to remotely determine the latent environmental effect or latent structural change. When the latent environmental effect is, for example, moisture that may lead to corrosion of an insulated carbon steel pipe, vessel or structural member, then the reactive portion of the transponder can be an electrical conductor, such as steel wire, that corrodes when exposed to moisture.

DETAILED DESCRIPTION OF THE INVENTION

Figure 1:
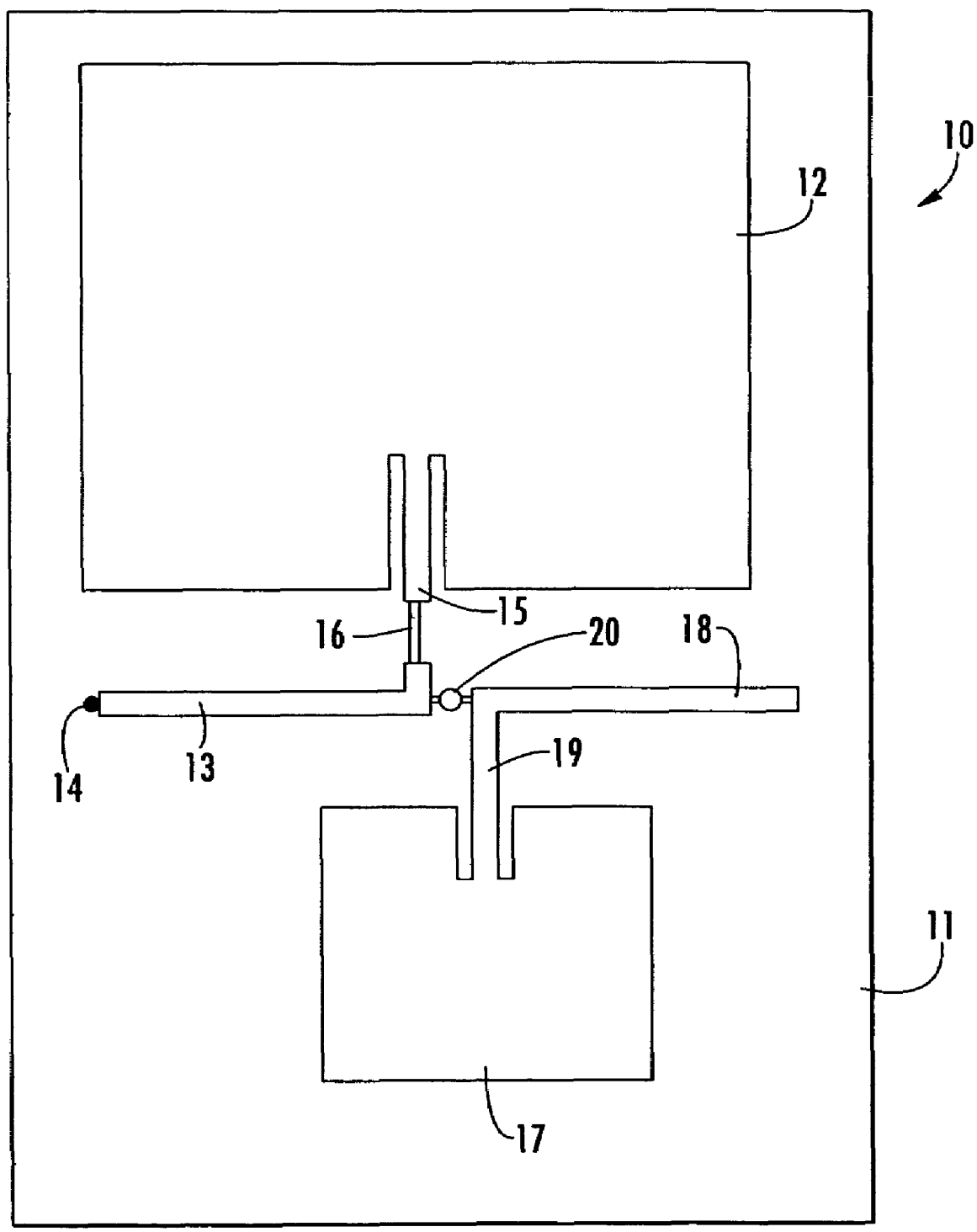
FIG. 1 is a front view of a harmonic electromagnetic transponder that can be used in the method of the instant invention, the transponder incorporating a corrodible link in the transmission line between a first patch antenna and resonator tuned to a fundamental electromagnetic frequency, the first resonator in electrical communication with a second resonator, patch antenna and transmission line tuned to the first harmonic of the fundamental electromagnetic frequency by way of a Schottky diode.

Referring now to FIG. 1, therein is shown a front view of a harmonic electromagnetic transponder 10 that can be used in the method of the instant invention. The transponder 10 is based on a fifteen by thirty centimeter panel of 1.52 millimeter thick glass fiber reinforced polymer substrate 11 having a normal dielectric constant of 3.5. The back side of the substrate 11 is coated with a 0.04 millimeter thick layer of copper ground plane, not shown. An 87.25 millimeter by 108.2 millimeter, 0.04 millimeter thick copper receiving patch antenna 12 is formed on the front of the substrate 11. A 49 millimeter by 4 millimeter, 0.04 millimeter thick copper first resonator 13 is also formed on the front of the substrate 11. The distal end of the first resonator 13 is electrically connected to the copper ground plane by soldered wire 14. A 45.8 millimeter by 4 millimeter, 0.04 millimeter thick copper fifty ohm impedance first transmission line 15 is also formed on the front of the substrate 11 in electrical communication at one end with the receiving patch antenna 12 and at the other end thereof with the first resonator 13. A portion of the first transmission line 15 is comprised of a short length of carbon steel wire 16.

Referring still to FIG. 1, a 44 millimeter by 53.75 millimeter, 0.04 millimeter thick copper emitting patch antenna 17 is formed on the front of the substrate 11. A 49 millimeter by 4 millimeter, 0.04 millimeter thick copper second resonator 18 is formed on the front of the substrate 11. A 32.2 millimeter by 4 millimeter, 0.04 millimeter thick copper fifty ohm impedance second transmission line 19 is also formed on the front of the substrate 11 in electrical communication at one end thereof with the emitting patch antenna 17 and at the other end thereof with the second resonator 18. The central ends of the first resonator 13 and the second resonator 18 are in electrical communication by way of a Schottky diode 20.

Referring still to FIG. 1 and the transponder 10, it will be understood by a person of ordinary skill in the art that the exact dimensions of the antenna patches and resonators of a harmonic radar transponder will usually require adjustment to tune the system, as described, for example, by Chang, RF And Microwave Circuit And Component Design For Wireless Systems, 2002, Chapter 12.9, MICROSTRIP PATCH ANTENNAS. A general discussion of the design of passive harmonic transponders is found, for example, by Maas, The RF and Microwave Circuit Design Cookbook, 1998, Chapter 4, SINGLE-DIODE RESISTIVE FREQUENCY DOUBLER. The transponder 10 is specifically designed to receive 917 MHz and emit 1.834 GHz. Copper coated dielectric sheets are commercially available, for example, from Taconic Advanced Dielectric Division, Petersburg, N.Y. The transponder 10 is specifically designed to be placed under the thermal insulation of an insulated carbon steel tank.

Figure 2:
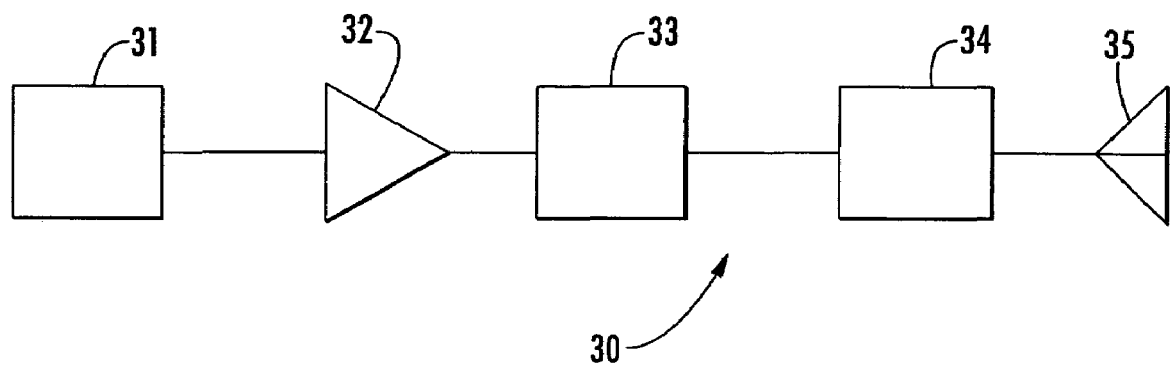
FIG. 2 is a block diagram of a transmitter that can be used in the method of the instant invention.

Referring now to FIG. 2, therein is shown a radar transmitter system 30 for transmitting electromagnetic radiation having a frequency of 917 MHz. The transmitter system 30 includes an oscillator 31 (Miteq, Inc., Hauppauge, N.Y., Model BCO-20-917-12) connected to a radio frequency amplifier 32, connected to a low pass filter 33, connected to a notch filter 34 and then to a Yagi antenna 35.

Figure 3:
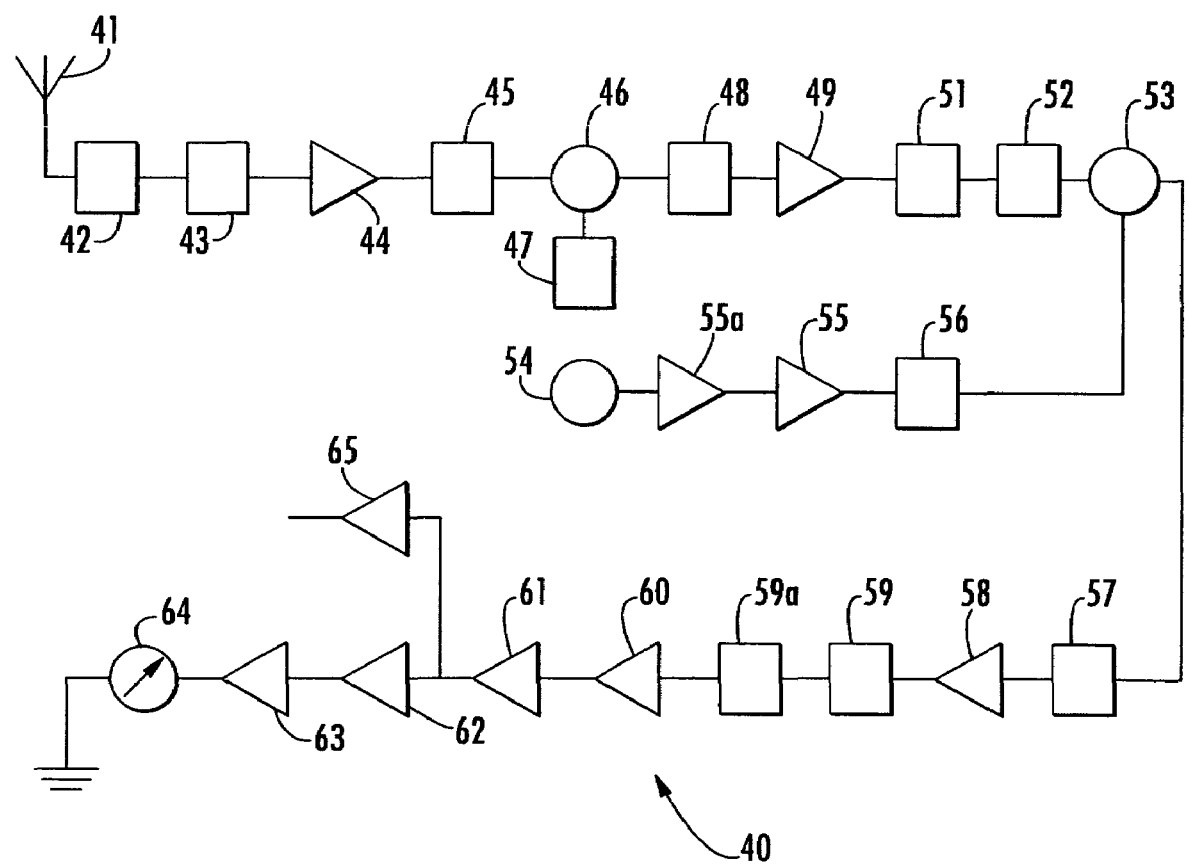
FIG. 3 is a block diagram of a receiver that can be used in the method of the instant invention.

Referring now to FIG. 3, therein is shown a radar receiving system 40 for receiving electromagnetic radiation having a frequency of 1.834 GHz. The receiver system 40 includes an Yagi antenna 41 connected to a high pass filter 42 (1.58 GHz) connected to a notch filter 43 (917 MHz), connected to low noise amplifier 44, connected to low pass filter 45 (2.4 GHz) which is connected to a first mixer 46. An oscillator 47 (Miteq, Inc., Model BCO-20-1666-12, 1.666 GHz) is connected to the mixer 46 to produce a first intermediate frequency of 168 MHz fed to low pass filter 48 (180 MHz), to amplifier 49 (30 dB Gain), and then to fifty ohm attenuator 51. The output from the attenuator 51 is fed to a helical resonator band pass filter 52 (167 MHz) and then to a second mixer 53. The mixer 53 is connected to a low pass filter 56 (180 MHz), amplifier 55 (MMIC), amplifier 55a (High Impedance Buffer Amplifier) and crystal oscillator 54 (146.6 MHz) to produce a second intermediate frequency of 10.7 MHz which is fed to low pass filter 57 (30 MHz), to amplifier 58 (20 dB Gain), to crystal filter 59 (21.4 MHz), to low band pass filter 59a (30 MHz) and then to log amplifier 60. The output of the log amplifier 60 is fed to an operational amplifier 61 (utilized as a DC gain block) to a time averaging integration amplifier system 62, to a DC offset operational amplifier 63 and then to signal meter 64. The output of the operational amplifier 63 is fed into a buffer amplifier 65 where the logarithmic signal strength reading is fed outside of the radar system.

It should be understood that the apparatus of FIGS. 1–3 is but one specific example of apparatus that can be used in the method of the instant invention. For example, the carbon steel wire 16 of FIG. 1 (or other corrodible metal) can alternatively be positioned anywhere else in the circuit of the transponder, for example as a part of the second transmission line, the first resonator, the second resonator or the leads to the Schottky diode. Any non-linear element can be used in place of the Schottky diode even though a Schottky diode is highly preferred.

The term "latent environmental effect" here and in the claims includes, without limitation thereto, temperature, humidity, salts, acids, bases, ions, corrosive fumes and chemical vapors concealed from ordinary view such as moisture under insulation or chloride ions in a steel reinforced concrete bridge deck. The term "latent structural change" here and in the claims includes, without limitation thereto, a change of position, acceleration, strain or vibration of a structure concealed from ordinary view. The term "reactive portion" includes, without limitation thereto, a corrodible conductor, a thermostatic switch, a resistor or capacitor whose resistance or capacitance varies as a function of temperature, humidity, exposure to a chemical, acceleration, vibration, or strain.

The term "harmonic electromagnetic transponder" means an electronic device having a receiving antenna or an element that acts as a receiving antenna in electrical communication, directly or indirectly, with an emitting antenna or an element that acts as an emitting antenna by way of a non-linear element such as the PN junction of a diode or a transistor. Thus, almost any modern electronic device (such as a transistor radio or a computer) will act as a harmonic electromagnetic transponder. However, preferably the harmonic electromagnetic transponder used in the instant invention is designed as such.

Preferably, the harmonic electromagnetic transponder used in the instant invention is a passive harmonic electromagnetic transponder. However, an active harmonic electromagnetic transponder can be used and may be preferred when it is desired to digitally code the harmonic emission of the transponder. Such digital coding is known for other applications, see, for example, U.S. Pat. No. 4,001,822.

EXAMPLE 1

The transponder 10 of FIG. 1 is positioned under the thermal insulation of a carbon steel vessel located in a tank farm of an industrial facility. The antennas 35 and 41 of the transmitter 30 and the receiver 40 of FIGS. 2 and 3 respectively are pointed at the tank from a distance of fifty feet. The transmitter 30 is turned on to direct electromagnetic radiation at the transponder 10. The signal indicated by the meter 64 of the receiver 40 is twelve decibels.

Every month for the next sixty nine months, the antennas 35 and 41 of the transmitter 30 and the receiver 40 of FIGS. 2 and 3 respectively are pointed at the tank from a distance of fifty feet. The transmitter 30 is turned on to direct electromagnetic radiation at the transponder 10. The signal indicated by the meter 64 of the receiver 40 is twelve decibels each time the transponder 10 is interrogated. However, the interrogation at seventy months indicates a response of only two decibels.

The insulation is removed from the tank at the location of the transponder 10 and it is noticed that the insulation is wet, the carbon steel wire 16 of the transponder 10 has corroded away apparently destroying the function of the first transmission line 15. However, the tank has suffered only superficial latent corrosion under the insulation. Investigation reveals that the wet insulation is caused by weathering of a seam in the insulation near the top of the tank. The insulation is removed from the tank and replaced with new insulation.

EXAMPLE 2

A transponder like the transponder 10 of FIG. 1 (but not having the carbon steel wire 16 in the transmission line 15 and instead having a carbon steel wire soldered at each end thereof to and bridging the first resonator 13 and the second resonator 18) is positioned under the thermal insulation of a carbon steel tank located in a tank farm of an industrial facility. The antennas 35 and 41 of the transmitter 30 and the receiver 40 of FIGS. 2 and 3 respectively are pointed at the tank from a distance of sixty feet. The transmitter 30 is turned on to direct electromagnetic radiation at the transponder 10. The signal indicated by the meter 64 of the receiver 40 is two decibels.

Every month for the next eighty eight months, the antennas 35 and 41 of the transmitter 30 and the receiver 40 of FIGS. 2 and 3 respectively are pointed at the tank from a distance of fifty feet. The transmitter 30 is turned on to direct electromagnetic radiation at the transponder 10. The signal indicated by the meter 64 of the receiver 40 is two decibels each time the transponder 10 is interrogated. However, the interrogation at eighty nine months indicates a response of ten decibels.

The insulation is removed from the tank at the location of the transponder and it is noticed that the insulation is wet, the carbon steel wire of the transponder has corroded away apparently enabling the transponder to function. However, the tank has suffered only superficial latent corrosion under the insulation caused by inadvertent tearing the insulation near the top of the tank when an adjacent pipeline was painted. The insulation is removed from the tank and replaced with new insulation.

EXAMPLE 3

A reference transponder like the transponder 10 of FIG. 1 is produced but having no carbon steel wire in the first transmission line 15. The reference transponder is positioned under the thermal insulation near one end of a carbon steel tank of an over-the-road tank trailer. A transponder like the transponder 10 of FIG. 1 is produced (but having no carbon steel wire in the first transmission line 15 but having a thermostatic switch bridging the first resonator 13 and the second resonator 18) and positioned under the thermal insulation of the tank trailer near the other end of the tank trailer. The tank trailer is used to transport molten sulfur from a sulfur recovery installation to a sulfuric acid production plant. The molten sulfur in the tank trailer needs to be at least one hundred and forty degrees Celsius when the tank trailer leaves the sulfur recovery installation so that the sulfur is still molten by the time the tank trailer arrives at the sulfuric acid plant. The thermostatic switch closes at one hundred and fifty degrees Celsius and opens at one hundred and forty degrees Celsius.

The transmitter 30 of FIG. 2 and the receiver 40 of FIG. 3 are installed at the gate of the sulfur recovery installation. The output of the amplifier 63 is monitored each time the tank trailer passes out of the sulfur recovery installation on its way to the sulfuric acid plant. A normal response pattern is a response of about forty to fifty decibels as the reference transponder passes the receiver 40 and a response of about three to four decibels as the other transponder passes the receiver 40. However, on one occasion the response pattern is a response of forty three decibels as the reference transponder passes the receiver 40 and a response of forty decibels the other transponder passes the receiver 40. The tank trailer is checked and it is discovered that the temperature of the molten sulfur is only one hundred and thirty degrees. The tank trailer emptied and refilled with sulfur at a temperature of one hundred and fifty degrees Celsius. The response pattern is then a response of forty six decibels as the reference transponder passes the receiver 40 and a response of three decibels the other transponder passes the receiver 40.

EXAMPLE 4

A transponder like the transponder 10 of FIG. 1 (but not having the carbon steel wire 16 in the transmission line 15 and instead being bisected on a line perpendicular and through the transmission line 15) is positioned under the fire resistant thermal insulation of a carbon steel building girder with the two parts of the transponder in close association with each other but separately attached to the girder, the location of the bisection line of the transponder being at a location of maximum stress of the girder. The antennas 35 and 41 of the transmitter 30 and the receiver 40 of FIGS. 2 and 3 respectively are pointed at the girder from a distance of five feet. The transmitter 30 is turned on to direct electromagnetic radiation at the transponder 10. The signal indicated by the meter 64 of the receiver 40 is one hundred decibels.

Every month for the next one hundred and seventeen months, the antennas 35 and 41 of the transmitter 30 and the receiver 40 of FIGS. 2 and 3 respectively are pointed at the transponder from a distance of five feet. The transmitter 30 is turned on to direct electromagnetic radiation at the transponder 10. The signal indicated by the meter 64 of the receiver 40 is one hundred decibels each time the transponder 10 is interrogated. However, the interrogation at one hundred and eighteen months indicates a response of only ten decibels.

The insulation is removed from the girder at the location of the transponder and it is noticed that the girder is cracked and that the two parts of the transponder have separated and prevented the transponder from functioning in its normal way. The girder is repaired by welding the crack and by welding reinforcing plates to the girder at a location of maximum stress of the girder.

EXAMPLE 5

A transponder like the transponder 10 of FIG. 1 (but not having the carbon steel wire 16 in the transmission line 15 and instead having a thermistor soldered at each end thereof to and bridging the first resonator 13 and the second resonator 18) is positioned under the thermal insulation of a carbon steel tank located in a tank farm of an industrial facility. The antennas 35 and 41 of the transmitter 30 and the receiver 40 of FIGS. 2 and 3 respectively are pointed at the tank from a distance of sixty feet. The transmitter 30 is turned on to direct electromagnetic radiation at the transponder 10. The signal indicated by the meter 64 of the receiver 40 is a function of the temperature of the thermistor.

What is claimed is:

1. A method for detecting a latent environmental effect or a latent structural change at a known remote concealed location, comprising the steps of: (a) using a harmonic electromagnetic transponder at the known remote concealed location of the latent environmental effect or the latent structural change, the harmonic electromagnetic transponder having a reactive portion which reacts to the latent environmental effect or latent structural change to modify the harmonic emission of the transponder; (b) remotely interrogating the transponder by directing electromagnetic radiation at the transponder; and (c) using the harmonic emission of the transponder to remotely determine the latent environmental effect or latent structural change.

2. The method of claim 1, wherein the harmonic electromagnetic transponder is a passive harmonic electromagnetic transponder.

3. The method of claim 1, wherein the harmonic emission of the transponder is digitally coded so that the transponder can be uniquely identified.

4. The method of claim 3, wherein the harmonic electromagnetic transponder is an active harmonic electromagnetic transponder.

5. The method of claim 1, wherein the latent environmental effect is a condition that may lead to inadvertent latent corrosion of a metal structure.

6. The method of claim 5, wherein the metal structure is selected from the group consisting of a metal pipe, a metal vessel and a metal structural member.

7. The method of claim 6, wherein the metal structure is selected from the group consisting of an insulated steel pipe, an insulated steel vessel and an insulated steel structural member.

8. The method of claim 7, wherein the reactive portion of the transponder is an electrical conductor that corrodes when it is exposed to the condition that may lead to the inadvertent latent corrosion of the tank.

9. The method of claim 1, wherein the reactive portion of the transponder is a manually re-settable switch that opens or closes in response to an environmental effect or to a structural change.

10. The method of claim 1, wherein the reactive portion of the transponder is an automatically re-setting switch that opens and closes in response to an environmental effect or to a structural change.

11. The method of claim 1, wherein the reactive portion of the transponder is a non re-settable element which responds to an environmental effect or to a structural change.

12. The method of claim 1, wherein the reactive portion of the transponder is a thermistor.

13. The method of claim 1, wherein the reactive portion of the transponder is a humidity sensor whose resistance is a function of the humidity of the sensor.

14. The method of claim 1, wherein the reactive portion of the transponder is a humidity sensor whose capacitance is a function of the humidity of the sensor.

15. The method of claim 1, wherein the reactive portion of the transponder is a switch that opens or closes in the event of a structural change.

16. A method for detecting a latent environmental effect or a latent structural change at a known remote concealed location, comprising the steps of: (a) directing electromagnetic radiation to the known remote concealed location; (b) resonating the electromagnetic radiation at the known remote concealed location; (c) converting the resonated electromagnetic radiation to a harmonic thereof at the known remote concealed location; (c) transmitting the harmonic electromagnetic radiation from the known remote concealed location; and (d) using the transmitted harmonic electromagnetic radiation to remotely determine the latent environmental effect or the latent structural change by measuring the relative strength of the transmitted harmonic electromagnetic radiation from the known remote concealed location.

* * * * *